US010173158B2

(12) United States Patent
Motomura et al.

(10) Patent No.: US 10,173,158 B2
(45) Date of Patent: Jan. 8, 2019

(54) LAMINATED NONWOVEN FABRIC, AIR PURIFIER, AND MANUFACTURING METHOD OF LAMINATED NONWOVEN FABRIC

(71) Applicant: Panasonic Intellectual Property Management Co., Ltd., Osaka (JP)

(72) Inventors: Koji Motomura, Osaka (JP); Hiroto Sumida, Nara (JP); Takahiro Kurokawa, Tokyo (JP); Taichi Nakamura, Osaka (JP); Takayoshi Yamaguchi, Osaka (JP); Takatoshi Mitsushima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/167,820

(22) Filed: May 27, 2016

(65) Prior Publication Data

US 2016/0367924 A1    Dec. 22, 2016

(30) Foreign Application Priority Data

Jun. 19, 2015   (JP) .................................. 2015-123809

(51) Int. Cl.
*B01D 39/16* (2006.01)
*B32B 5/02* (2006.01)
(Continued)

(52) U.S. Cl.
CPC .......... *B01D 39/1623* (2013.01); *B32B 5/022* (2013.01); *B32B 5/08* (2013.01); *B32B 5/26* (2013.01); *B32B 7/02* (2013.01); *B32B 7/12* (2013.01); *B32B 7/14* (2013.01); *B32B 37/0053* (2013.01); *B32B 37/24* (2013.01); *B01D 2239/0435* (2013.01); *B01D 2239/1208* (2013.01); *B01D 2239/1233* (2013.01); *B32B 2037/1215* (2013.01); *B32B 2037/243* (2013.01); *B32B 2255/02* (2013.01);
(Continued)

(58) Field of Classification Search
CPC ............ B01D 39/1623; B01D 39/2017; B01D 2239/435; B01D 2239/1208; B01D 2239/1233; B32B 5/22; B32B 7/12
See application file for complete search history.

(56) References Cited

U.S. PATENT DOCUMENTS

2006/0009743 A1*  1/2006  Wang ................. A61F 13/15634
                                                  604/365
2008/0070022 A1*  3/2008  Umezu .............. B01D 39/1623
                                                  428/220
(Continued)

FOREIGN PATENT DOCUMENTS

JP    2001-098453      4/2001
JP    2004-105829 A    4/2004
(Continued)

*Primary Examiner* — Duane Smith
(74) *Attorney, Agent, or Firm* — Pearne & Gordon LLP

(57) ABSTRACT

A laminated nonwoven fabric includes a first nonwoven fabric and a second nonwoven fabric. The first nonwoven fabric contains charged first fibers. The second nonwoven fabric contains second fibers, and is laminated on the first nonwoven fabric. A fiber diameter of the first fibers is larger than a fiber diameter of the second fibers.

10 Claims, 2 Drawing Sheets

(51) Int. Cl.
  *B32B 7/12*    (2006.01)
  *B32B 5/08*    (2006.01)
  *B32B 5/26*    (2006.01)
  *B32B 7/02*    (2006.01)
  *B32B 7/14*    (2006.01)
  *B32B 37/00*   (2006.01)
  *B32B 37/24*   (2006.01)
  *B32B 37/12*   (2006.01)

(52) U.S. Cl.
  CPC ....... *B32B 2255/26* (2013.01); *B32B 2262/02* (2013.01); *B32B 2262/0238* (2013.01); *B32B 2262/0284* (2013.01); *B32B 2262/0292* (2013.01); *B32B 2262/14* (2013.01); *B32B 2305/20* (2013.01); *B32B 2307/20* (2013.01); *B32B 2307/724* (2013.01); *B32B 2307/732* (2013.01)

(56) References Cited

U.S. PATENT DOCUMENTS

| | | | | |
|---|---|---|---|---|
| 2011/0151739 | A1* | 6/2011 | Bosler | A61F 13/15593 |
| | | | | 442/396 |
| 2011/0196332 | A1* | 8/2011 | Cheng | A61F 13/4753 |
| | | | | 604/385.24 |
| 2011/0309014 | A1 | 12/2011 | Hosoya et al. | |
| 2013/0047856 | A1 | 2/2013 | Takeuchi et al. | |

FOREIGN PATENT DOCUMENTS

| | | |
|---|---|---|
| JP | 2011-235219 A | 11/2011 |
| WO | 2010/073958 A1 | 7/2010 |

\* cited by examiner

LAMINATED NONWOVEN FABRIC, AIR PURIFIER, AND MANUFACTURING METHOD OF LAMINATED NONWOVEN FABRIC

BACKGROUND

1. Technical Field

The present disclosure relates to a laminated nonwoven fabric, and particularly to a laminated nonwoven fabric used for a filter medium of an air purifier.

2. Description of the Related Art

There are cases where a nonwoven fabric to be charged is used as a filter medium of an air purifier (for example, refer to Japanese Patent Unexamined Publication No. 2001-98453). Such a filter medium captures dust by using an electrostatic force (Coulomb force) generated between the filter medium and the dust sucked into the air purifier.

SUMMARY

An aspect of the present disclosure is a laminated nonwoven fabric. The laminated nonwoven fabric includes a first nonwoven fabric and a second nonwoven fabric. The first nonwoven fabric contains charged first fibers. The second nonwoven fabric contains second fibers, and is laminated on the first nonwoven fabric. A fiber diameter of the first fibers is greater than a fiber diameter of the second fibers.

Another aspect of the present disclosure is an air purifier. The air purifier includes a sucker of a gas; a discharger of the gas; and the above-mentioned laminated nonwoven fabric disposed between the sucker and the discharger. In the laminated nonwoven fabric, the first nonwoven fabric has a first surface and a second surface facing the second nonwoven fabric on an opposite side to the first surface, and the first surface faces the sucker.

Still another aspect of the present disclosure is a manufacturing method of a laminated nonwoven fabric. In this manufacturing method, a first nonwoven fabric containing charged first fibers is prepared. On the other hand, a raw material liquid containing a raw material resin as a raw material of second fibers and a solvent dissolving the raw material resin is prepared. A third nonwoven fabric containing third fibers is prepared. The raw material liquid is sprayed onto the third nonwoven fabric so that the second fibers are generated from the raw material liquid, and a second nonwoven fabric is formed by accumulating the second fibers on the third nonwoven fabric. A solid adhesive is sprayed onto a first surface of the second nonwoven fabric, where the first surface is opposite to a second surface facing the third nonwoven fabric. The solid adhesive sprayed onto the first surface is melted. The first nonwoven fabric is laminated on the first surface of the second nonwoven fabric having the melted adhesive.

As mentioned above, according to the present disclosure, it is possible to provide a laminated nonwoven fabric with high long-term dust collection efficiency and low pressure loss.

DETAILED DESCRIPTION OF THE PREFERRED EMBODIMENT

Prior to description of an embodiment of the present disclosure, problems of an air purifier of the related art will be described briefly. In a case where a nonwoven fabric to be charged is used as a filter medium, if dust collection progresses, the vicinity of fabrics forming the nonwoven fabric is covered with dust. Thus, the electric field strength caused by electric charge of the fabrics is weakened. Therefore, an electrostatic force generated between the dust and the nonwoven fabric to be charged is reduced, and thus dust collection efficiency (dust-capturing capability) is lowered. In order to maintain high long-term dust collection efficiency, a surface area may be increased, for example, by increasing the mass (density) of the nonwoven fabric to be charged. However, if the density of the nonwoven fabric is increased, a flow channel of a fluid becomes small. Thus, the resistance to the fluid becomes large, so that the pressure loss (resistance when the fluid passes through the nonwoven fabric) becomes high. In other words, the high long-term dust collection efficiency and the low pressure loss are reciprocal properties, so that it is difficult to make both of the properties compatible with each other.

Figure 1:
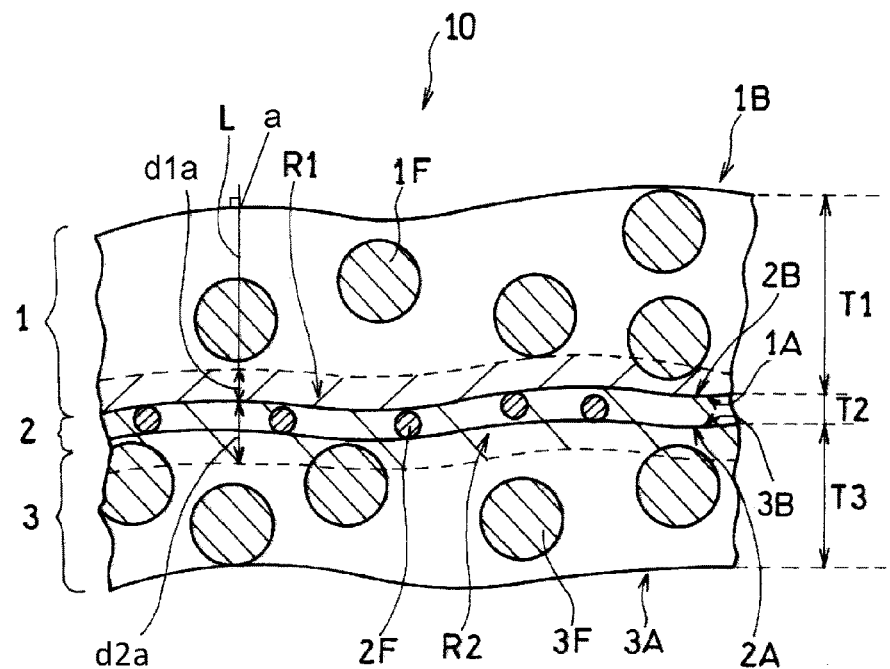
FIG. 1 is a sectional view schematically illustrating a laminated nonwoven fabric according to an embodiment of the present disclosure.

Hereinafter, with reference to FIG. 1, laminated nonwoven fabric 10 according to an embodiment of the present disclosure will be described. FIG. 1 is a sectional view schematically illustrating laminated nonwoven fabric 10.

Laminated nonwoven fabric 10 includes first nonwoven fabric 1 containing first fibers 1F and second nonwoven fabric 2 laminated on the first nonwoven fabric 1 and containing second fibers 2F. First nonwoven fabric 1 is charged, and fiber diameter D1 of first fibers IF is larger than fiber diameter D2 of second fibers 2F (D1>D2). Note that the expression that a nonwoven contains fibers means that the nonwoven contains the fibers as a major component, and the content of the major component is 80 weight % or greater. First nonwoven fabric 1 has principal surface 1B as a first surface and principal surface 1A as a second surface on an opposite side to the principal surface 1B. Second nonwoven fabric 2 has principal surface 2B as a first surface facing first nonwoven fabric 1, and principal surface 2A as a second surface opposite to principal surface 2B, and is laminated on principal surface 1A of first nonwoven fabric 1. In a case where the fabric density of second nonwoven fabric 2 is low, principal surfaces 2A and 2B may not be clear. In this case, for convenience, a boundary between first nonwoven fabric 1 and second nonwoven fabric 2 is assumed to be principal surface 2B, and an opposite side thereto is assumed to be principal surface 2A. As illustrated in FIG. 1, in a case where third nonwoven fabric 3 is laminated on second nonwoven fabric 2, principal surface 2A indicates a boundary between second nonwoven fabric 2 and third nonwoven fabric 3. Principal surface 1A and principal surface 1B of first nonwoven fabric 1, principal surface 2A and principal surface 2B of second nonwoven fabric 2, and principal surface 3A and principal surface 3B of third nonwoven fabric 3 respectively indicate surfaces of the nonwoven fabrics, and may be uneven surfaces.

If the external air containing dust comes into contact with laminated nonwoven fabric 10 from first nonwoven fabric 1 of laminated nonwoven fabric 10, the dust is preferentially captured by charged first nonwoven fabric 1. If dust collection progresses, and an electrostatic force generated between first nonwoven fabric 1 and the dust is reduced, the dust starts to pass through first nonwoven fabric 1. The dust having passed through first nonwoven fabric 1 is captured by second nonwoven fabric 2. Second nonwoven fabric 2 contains second fibers 2F having the smaller diameters than those of first fibers 1F so as to achieve high dust collection efficiency and also to hardly increase pressure loss.

First Nonwoven Fabric

First nonwoven fabric 1 is charged (permanently charged). In other words, first nonwoven fabric 1 holds electric polarization semi-permanently in a state in which an external electric field is not present, and forms an electric field in the vicinity thereof. Thus, dust is captured by first nonwoven fabric 1 due to an electrostatic force generated between the first nonwoven fabric 1 and the dust. First nonwoven fabric 1 functions as a protection material which protects second nonwoven fabric 2 from various external loads.

First nonwoven fabric 1 contains first fibers 1F. Materials of first fibers 1F are not particularly limited, and may include, for example, glass fibers, cellulose, acrylic resin, polypropylene (PP), polyethylene (PE), polyester (for example, polyethylene terephthalate (PET), polybutylene terephthalate), polyamide (PA), or mixtures thereof. Above all, PP is preferred in the material is easily charged, and charging property thereof is easily maintained.

Fiber diameter D1 of first fibers 1F is not particularly limited as long as fiber diameter D1 is larger than fiber diameter D2 of second fibers 2F contained in the second nonwoven fabric. Fiber diameter D1 is, for example, 0.5 μm to 20 μm, and is preferably 5 μm to 20 μm.

Fiber diameter D1 indicates an average value of diameters of first fibers 1F. The diameter of first fiber 1F is a diameter of a section perpendicular to a length direction of first fiber 1F. In a case where such a section is not circular, a maximum diameter may be considered as the diameter. A width in a direction perpendicular to the length direction of first fiber 1F when viewed from the normal direction of one principal surface of first nonwoven fabric 1 may be regarded as the diameter of first fibers 1F. Fiber diameter D1 is an average value of diameters of any ten first fibers 1F contained in the first nonwoven fabric at any locations. This is also the same for fiber diameters D2 and D3 will be described later.

First nonwoven fabric 1 is a nonwoven fabric manufactured by using, for example, a spun bonding method, a dry method (for example, an air-laid method), a wet method, a melt blow method, a needle punch method, or the like, and a manufacturing method thereof is not particularly limited. Above all, first nonwoven fabric 1 is preferably manufactured by using the melt blow method in that it is easy to form a nonwoven fabric having a small fiber diameter appropriate for a filter medium.

A pressure loss of first nonwoven fabric 1 is not particularly limited. Above all, in a case of performing measurement with a measuring machine in conformity with the regulations of JIS B9908, Form 1, an initial pressure loss of first nonwoven fabric 1 is preferably about 1 Pa to 10 Pa. As long as the initial pressure loss of first nonwoven fabric 1 falls within this range, an initial pressure loss of the whole of laminated nonwoven fabric 10 is also suppressed. In the test method in the above-mentioned Form 1, a pressure loss is measured as follows. A filter unit having laminated nonwoven fabric 10 is held in a unit fixer without leakage of air. A static pressure measurer is attached to the filter unit. The static pressure measurer includes straight tubes sandwiching the filter unit therebetween, and the straight tubes are provided with static pressure measurement holes, respectively, perpendicular to tube walls on an upstream side and a downstream side. In this state, a blower sends wind to the filter unit in a rated air volume. The static pressure on the upstream side and that on the downstream side are measured by manometers which are connected to the static pressure measurement holes via tubes, respectively, and thus the pressure loss is obtained.

Thickness T1 of first nonwoven fabric 1 is preferably 100 μm to 500 μm, and is more preferably 150 μm to 400 μm, from the viewpoint of pressure loss. Thickness T of the nonwoven fabric is, for example, an average value of thicknesses of any ten locations in the nonwoven fabric (the same applies hereinafter). The thickness is a distance between two principal surfaces of the nonwoven fabric. Specifically, an image of a section of the nonwoven fabric is captured, and, when a line perpendicular to one surface is drawn from any one point on one principal surface of the nonwoven fabric to the other principal surface, among fibers on the line, a distance between outsides of two fibers which are most distant from each other is obtained as thickness T of the nonwoven fabric. This is similarly performed on a plurality of other any points (for example, nine points) so that thicknesses of the nonwoven fabric are calculated, and a numerical value obtained by averaging the thicknesses is used as thickness T of the nonwoven fabric. When thickness T is calculated, an image having undergone a binarization process may be used.

Mass per unit area of first nonwoven fabric 1 is preferably 10 $g/m^2$ to 50 $g/m^2$, and is more preferably 10 $g/m^2$ to 30 $g/m^2$, from the viewpoint of pressure loss.

A method of charging first nonwoven fabric 1 is not particularly limited, and a well-known charging method may be used. Examples of the charging method may include a corona discharging method, a pure water suction method, and a friction charging method. Timing of performing charging is not particularly limited either. For example, charging may be performed at the same as spinning of first fibers 1F forming first nonwoven fabric 1, and, in a case where first fibers 1F are manufactured through extension, charging may be performed during extension. Charging may be performed after the nonwoven fabric is formed. A surface potential of first nonwoven fabric 1 is not particularly limited, and may be, for example, 5 kV to 100 kV.

First nonwoven fabric 1 has voids formed among the plurality of first fibers 1F. Porosity P1 of first nonwoven fabric 1 is not particularly limited, but is preferably 60% by volume to 95% by volume, and is more preferably 70% by volume to 90% by volume, from the viewpoint of pressure loss. Porosity P1 (% by volume) is expressed by, for example, (1—apparent mass of first nonwoven fabric 1 per unit volume/specific gravity of first fibers 1F)×100.

Second Nonwoven Fabric

Second nonwoven fabric 2 has a function of capturing dust along with first nonwoven fabric 1. Second nonwoven fabric 2 captures dust due to actions such as Brownian diffusion of the dust, gravity, and shielding instead of an electrostatic force.

Materials of second fibers 2F are not particularly limited, and may include, for example, polymers such as PA, polyimide (PI), polyamideimide (PAI), polyetherimide (PEI), polyacetal (POM), polycarbonate (PC), polyether ether ketone (PEEK), polysulfone (PSF), polyethersulfone (PES), polyphenylene sulfide (PPS), polytetrafluoroethylene (PTFE), polyarylate (PAR), polyacrylonitrile (PAN), polyvinylidene fluoride (PVDF), polyvinyl alcohol (PVA), polyvinyl acetate (PVAc), PP, PET, and polyurethane (PU). These materials may be used alone or in combination of two or more kinds thereof. Above all, as will be described later, in a case where second fibers 2F are formed by using an electrostatic spinning method, PES is preferably used.

Fiber diameter D2 of the second nonwoven fabric is smaller than fiber diameter D1 of the first nonwoven fabric. Above all, D2 is preferably ⅕ or less of D1 (D2≤D⅕), and D2 is more preferably 1/10 or less of D1 (D2≤D 1/10). D2 is preferably 1/100 or more of D1. As long as D2 falls within this range, a pressure loss is suppressed and dust collection efficiency also tends to increase. Specifically, fiber diameter D2 is preferably less than 1 μm, and is more preferably less than 500 nm. The fiber diameter D2 is preferably equal to or more than 50 nm, and is more preferably equal to or more than 100 nm.

Thickness T2 of second nonwoven fabric 2 is preferably 0.5 μm to 10 μm, and is more preferably 1 μm to 5 μm, from the viewpoint of pressure loss. Mass per unit area of second nonwoven fabric 2 is preferably 0.1 g/m$^2$ to 1.5 g/m$^2$, and is more preferably 0.2 g/m$^2$ to 0.8 g/m$^2$, from the viewpoint of pressure loss. As long as the mass of the second nonwoven fabric falls within this range, a pressure loss is suppressed and high dust collection efficiency also tends to be achieved. In a case where measurement is performed in the same condition as described above, an initial pressure loss of second nonwoven fabric 2 is preferably about 5 Pa to 40 Pa.

Third Nonwoven Fabric

Laminated nonwoven fabric 10 may further include third nonwoven fabric 3 laminated on principal surface 2A as the second surface of the second nonwoven fabric 2. Herein, the second surface does not face first nonwoven fabric 1. Third nonwoven fabric 3 is, for example, a base material for holding the shape of laminated nonwoven fabric 10. In a case of subjecting laminated nonwoven fabric 10 to pleating, first nonwoven fabric works as a base material, thereby holding the shape of a pleat.

Third nonwoven fabric 3 contains third fibers 3F. Materials of third fibers 3F are not particularly limited, and may include, for example, glass fibers, cellulose, acrylic resin, PP, PE, polyester such as PET, PA, or mixtures thereof. Above all, as materials of third fibers 3F, PET or cellulose is preferably used from the viewpoint of holding the shape. Fiber diameter D3 of third fibers 3F is not particularly limited, and is, for example, 0.5 μm to 20 μm, and is preferably 10 μm to 20 μm.

A manufacturing method of third nonwoven fabric 3 is not particularly limited, and the methods exemplified in first nonwoven fabric 1 may be exemplified in the same manner. Above all, third nonwoven fabric 3 is preferably manufactured by using the melt blow method from the viewpoint that it is easy to form a nonwoven fabric having a small fiber diameter appropriate for a filter medium.

A pressure loss of third nonwoven fabric 3 is also not particularly limited. Above all, in a case where measurement is performed in the same condition as described above, an initial pressure loss of third nonwoven fabric 3 is preferably about 1 Pa to 10 Pa. As long as the initial pressure loss of third nonwoven fabric 3 falls within this range, a pressure loss of the whole of laminated nonwoven fabric 10 is also suppressed.

Thickness T3 of third nonwoven fabric 3 is preferably 150 μm to 500 μm, and is more preferably 150 μm to 400 μm, from the viewpoint of pressure loss. Mass per unit area of third nonwoven fabric 3 is preferably 10 g/m$^2$ to 50 g/m$^2$, and is more preferably 10 g/m$^2$ to 45 g/m$^2$, from the viewpoint of pressure loss.

Third nonwoven fabric 3 also has voids formed among the plurality of third fibers 3F. Porosity P3 of third nonwoven fabric 3 is not particularly limited, but is preferably more than porosity P1 from the viewpoint of pressure loss (P1<P3). As will be described later, in a case where an adhesive is used for bonding between first nonwoven fabric 1 and second nonwoven fabric 2, if porosity P3 and porosity P1 satisfy P1<P3, this is preferred since the adhesive is easily unevenly distributed to second nonwoven fabric 2 (and third nonwoven fabric 3). Above all, porosity P3 is preferably 1.05 times or higher of porosity P1 (1.05× P1≤P3). Porosity P3 is two times or less of porosity P1 from the viewpoint of holding the shape.

Specifically, porosity P3 is preferably 65% by volume to 98% by volume. In the same manner as porosity P1, porosity P3 may also be calculated by using, for example, apparent mass of third nonwoven fabric 3 per unit volume and specific gravity of third fibers 3F.

Adhesive

In a case where laminated nonwoven fabric 10 includes first nonwoven fabric 1, second nonwoven fabric 2, and third nonwoven fabric 3, first nonwoven fabric 1 and second nonwoven fabric 2 are preferably bonded to each other with an adhesive (not illustrated). In this case, second nonwoven fabric 2 and third nonwoven fabric 3 are bonded to each other without using an adhesive. This is because the adhesive bonding first nonwoven fabric 1 to second nonwoven fabric 2 is easily unevenly distributed to second nonwoven fabric 2. A method of bonding second nonwoven fabric 2 to third nonwoven fabric 3 will be described later.

The adhesive is preferably unevenly distributed to second nonwoven fabric 2 in the vicinity of the interface between first nonwoven fabric 1 and second nonwoven fabric 2 from the viewpoint of suppressing a reduction in the electric field strength of first nonwoven fabric 1 in a manufacturing process. Specifically, the adhesive is preferably present in region R1 located by distance d1 from principal surface 1A of first nonwoven fabric 1 facing second nonwoven fabric 2, and region R2 located by distance d2 from principal surface 2B (which is the same as the principal surface of second nonwoven fabric 2 not facing third nonwoven fabric 3) of second nonwoven fabric 2 facing first nonwoven fabric 1. Distance d1 and distance d2 parity satisfy a relation of d1<d2. As mentioned above, the adhesive is unevenly distributed to second nonwoven fabric 2, and thus first fibers 1F having electric charge are hardly covered with the adhesive. Therefore, it is possible to suppress a reduction in the electric field strength of first nonwoven fabric 1 in the manufacturing process. In FIG. 1, for convenience, region R1 and region R2 are hatched.

Distance d1 and distance d2 may be calculated as follows, for example. First, a section of laminated nonwoven fabric 10 is captured, and straight line L perpendicular to principal surface 1B is drawn from any one point a on one principal surface (principal surface 1B) of laminated nonwoven fabric 10 to the other principal surface (principal surface 3A of third nonwoven fabric 3 not facing second nonwoven fabric 2). In the adhesive on straight line L, a distance between the adhesive farthest away from principal surface 1A and principal surface 1A in first nonwoven fabric 1 is set to distance d1a. Similarly, in the adhesive on straight line L, a distance between the adhesive farthest away from principal surface 2B and principal surface 2B in second nonwoven fabric 2 or third nonwoven fabric 3 is set to distance d2a. This is similarly performed on a plurality of any other points (for example, points b to j) so that distances $d1b$ to $d1j$ and $d2b$ to $d2j$ are calculated, and average values thereof are respectively set to distance $d1$ and distance $d2$. When distance $d1$ and distance $d2$ are calculated, an image having undergone a binarization process may be used.

Preferably, distance $d1$ is less than thickness $T1$ and is shorter than distance $d2$. The ratio $d1/d2$ of distance $d1$ to distance $d2$ is preferably equal to or higher than 0.2 and lower than 1, and is more preferably 0.3 to 0.8 from the viewpoint of suppressing a reduction in the magnetic field strength in a manufacturing process. From the similar viewpoint, a ratio $d1/T1$ of distance $d1$ to thickness $T1$ is preferably equal to or higher than 0.1 and lower than 0.5, and is more preferably equal to or higher than 0.15 and lower than 0.4.

Distance $d2$ is equal to or less than a sum ($T2+T3$) of thicknesses $T2$ and $T3$ ($d2 \leq (T2+T3)$). In a case where distance $d2$ is more than thickness $T2$ ($d2 > T2$), region $R2$ is a region including at least a part of second nonwoven fabric 2 and third nonwoven fabric 3. From the viewpoint of cost for the adhesive and pressure loss, a ratio $d2/(T2+T3)$ of distance $d2$ to thicknesses ($T2+T3$) is preferably 0.15 to 0.7.

An amount of the adhesive to be applied is not particularly limited, but is, for example, 0.5 $g/m^2$ to 5 $g/m^2$. The kind of adhesive is not particularly limited, and may include, for example, hot melt adhesives containing PU, polyester such as PET, PA, or polyolefin (for example, PP or PE) as a main component. Above all, from the viewpoint of adhesiveness, the adhesive is of the same kind as that of a material of first fibers 1F. For example, in a case where a material of first fibers 1F is PP, the adhesive preferably contains polyolefin. According to the present embodiment, even if the adhesive and first fibers 1F are made of the same kind of material, the adhesive tends to be unevenly distributed not on first nonwoven fabric 1 side but on second nonwoven fabric 2 side.

Air Purifier

Figure 2:
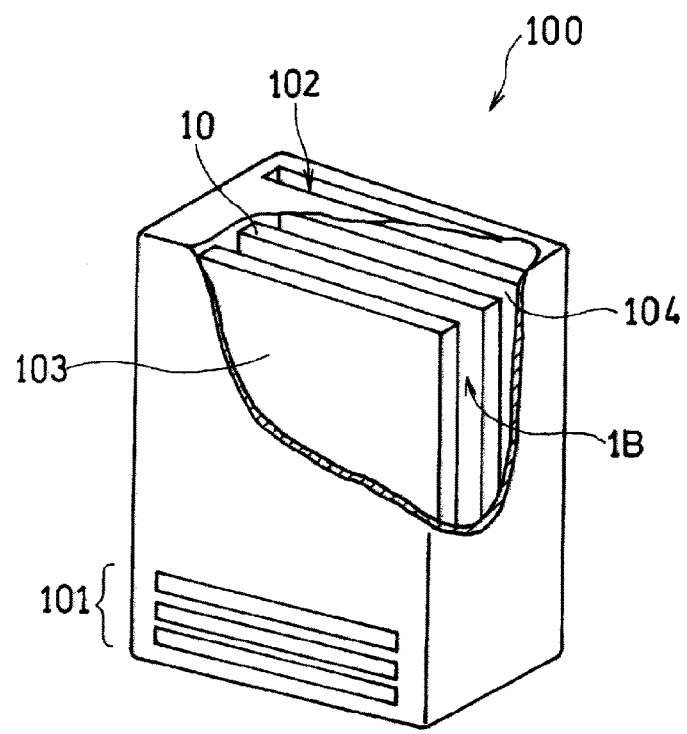
FIG. 2 is a perspective view schematically illustrating an air purifier according to the embodiment of the present disclosure.

Air purifier 100 according to the embodiment of the present disclosure includes laminated nonwoven fabric 10 to be used as a filter medium, sucker 101 of a gas, and discharger 102 of the gas as exemplified in FIG. 2. Laminated nonwoven fabric 10 is disposed between sucker 101 and discharger 102 such that principal surface 1B faces sucker 101. Laminated nonwoven fabric 10 may be subjected to pleating in a pleated state and disposed.

Air purifier 100 takes the external air from sucker 101 into the inside of air purifier 100. The taken air is subjected to dust collection during a time when the air passes through laminated nonwoven fabric 10 and the like, and the cleaned air is again discharged from discharger 102 into the outside.

Air purifier 100 may further include pre-filter 103 for capturing a large dust or the like between sucker 101 and laminated nonwoven fabric 10. Air purifier 100 may include a deodorizing filter 104 or a humidifying filter (not illustrated) between laminated nonwoven fabric 10 and discharger 102.

Manufacturing Method of Laminated Nonwoven Fabric

Laminated nonwoven fabric 10 is manufactured according to a method including, for example, a first preparation step, a second preparation step, a third preparation step, a nonwoven fabric forming step, an adhesive spraying step, a heating step, and a laminating step. In the first preparation step, first nonwoven fabric 1 containing charged first fibers 1F is prepared. In the second preparation step, raw material liquid 22 containing a raw material resin as a raw material of second fibers 2F and a solvent dissolving the raw material is prepared. In the third preparation step, a target (for example, third nonwoven fabric 3 containing third fibers 3F) is prepared. In the nonwoven fabric forming step, the raw material liquid is ejected onto third nonwoven fabric 3 so that second fibers 2F are generated from raw material liquid 22, and second nonwoven fabric 2 is formed by accumulating second fibers 2F on the target (one principal surface 3B of third nonwoven fabric 3). In the adhesive spraying step, solid adhesive 35 is sprayed onto the principal surface (principal surface 2B not facing third nonwoven fabric 3) of second nonwoven fabric 2 not facing the target. In the heating step, adhesive 35 sprayed onto the principal surface (2B) of the target is melted. In the laminating step, first nonwoven fabric 1 is laminated on second nonwoven fabric 2 having melted adhesive 35.

Figure 3:
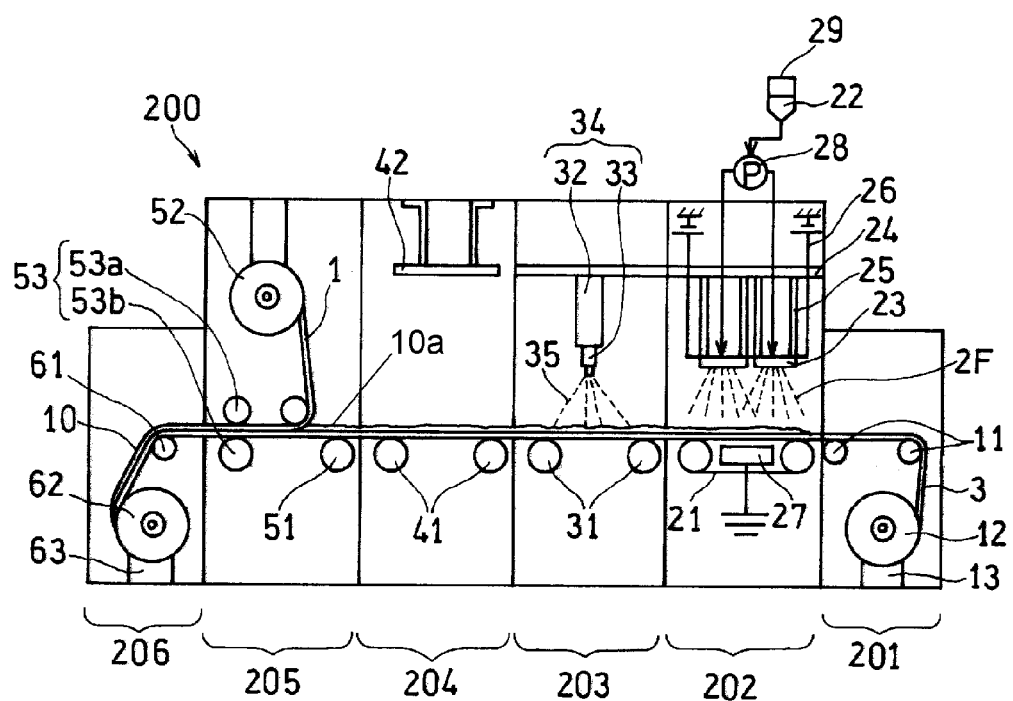
FIG. 3 is a schematic diagram illustrating a manufacturing method of the laminated nonwoven fabric according to the embodiment of the present disclosure.

Hereinafter, with reference to FIG. 3, a manufacturing method according to the embodiment of the present disclosure will be described. FIG. 3 is a schematic diagram illustrating manufacturing apparatus 200 which performs the manufacturing method according to the embodiment of the present disclosure. Herein, laminated nonwoven fabric 10 having adhesive 35 and third nonwoven fabric 3 will be exemplified.

(1) First, Second and Third Preparation Steps

In the respective preparation steps, first nonwoven fabric 1, raw material liquid 22 containing a raw material resin to be used as a raw material of fibers and a solvent dissolving the raw material resin, and third nonwoven fabric 3 are prepared.

Raw Material Liquid

Raw material liquid 22 contains the raw material resin and the solvent. The raw material resin is a raw material of second fibers 2F, and the solvent (hereinafter, referred to as a first solvent) dissolves the raw material resin. A mixing ratio of the raw material resin and the first solvent in raw material liquid 22 differs depending on the kind of selected raw material resin and the kind of first solvent. A proportion of the first solvent in raw material liquid 22 is, for example, 60% by mass to 95% by mass. Raw material liquid 22 may contain solvents other than the first solvent dissolving the raw material resin, various additives, or the like. The kind of raw material resin is not particularly limited, and the raw material resin may include polymers corresponding to the respective polymers exemplified as materials of second fibers 2F.

The first solvent is not particularly limited as long as the solvent can dissolve the raw material resin. Examples of the first solvent which can be used include methanol, ethanol, 1-propanol, 2-propanol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl n-hexyl ketone, methyl n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, N,N-dimethylacetamide (DMAc), dimethyl sulfoxide, pyridine, and water. These may be used alone or in combination of plural kinds thereof. Above all, second fibers 2F containing PES are formed according to an electrostatic spinning method, DMAc is preferred in that the material is appropriate for the electrostatic spinning method, and PES is easily dissolved.

(2) Nonwoven Fabric Forming Step

Next, raw material liquid 22 is ejected onto third nonwoven fabric 3 so that second fibers 2F are generated from raw material liquid 22, and second nonwoven fabric 2 is formed by accumulating second fibers 2F on principal surface 3B of third nonwoven fabric 3. As a method of generating second fibers 2F in the above-described way, for example, there may be a dry spinning method or an electrostatic spinning method. Above all, second fibers 2F is preferably formed by using the electrostatic spinning method in that fibers having small diameters can be formed. In the electrostatic spinning method, second fibers 2F are accumulated as a nonwoven fabric which is an aggregate of fibers in which one or more second fibers 2F are randomly superimposed (or entangled) on third nonwoven fabric 3.

Hereinafter, as an example, a description will be made of a case where manufacturing apparatus 200 includes an electrostatic spinning mechanism. In the electrostatic spinning method, a target (here, third nonwoven fabric 3) is grounded or negatively charged, and raw material liquid 22 which is positively charged is ejected thereonto from a discharge outlet (not illustrated). In a process in which raw material liquid 22 reaches third nonwoven fabric 3, some of the first solvent contained in raw material liquid 22 is vaporized, and second fibers 2F are accumulated on the principal surface 3B so that second nonwoven fabric 2 is formed. Second fibers 2F right after being formed contain, for example, 5% by mass to 10% by mass of the first solvent. At least some of the remaining first solvent is removed, and thus second fibers 2F which are comes into contact with each other, and second fibers 2F and third fibers 3F forming third nonwoven fabric 3 are respectively adhered to each other at points. In the above-described manner, second nonwoven fabric 2 is bonded to third nonwoven fabric 3.

The electrostatic spinning mechanism includes discharger 23, a charger (which will be described later), and a conveyer (which will be described later). Discharger 23 discharges raw material liquid 22 provided on an upper side in nonwoven fabric former 202. The charger positively charges discharged raw material liquid 22. The conveyer conveys third nonwoven fabric 3 which is disposed to face discharger 23, from the upstream side to the downstream side. The conveyer preferably includes conveyance belt 21. In this case, conveyance belt 21 functions as a collector which collects second fibers 2F along with third nonwoven fabric 3.

Third nonwoven fabric 3 is conveyed from feeder 201 disposed on the most upstream side of manufacturing apparatus 200 and is fed to the conveyer (conveyance belt 21) by conveyance roll 11. Third nonwoven fabric 3 is long and is wound on, for example, feed reel 12. Feed reel 12 is rotated due to driving of motor 13.

A plurality of discharge outlets (not illustrated) of raw material liquid 22 are provided on the side of discharger 23 facing principal surface 3B. Although a distance between the discharge outlet and principal surface 3B varies depending upon a scale of the manufacturing apparatus, the distance is, for example, 100 mm to 600 mm. Discharger 23 is supported by second support 25 which extends downward from first support 24 provided on the upper side in nonwoven fabric former 202 and in parallel to the conveyance direction of third nonwoven fabric 3, in such a manner that its own longitudinal direction is parallel to principal surface 3B.

The charger is formed of voltage applying device 26 applying a voltage to discharger 23, and counter electrode 27 provided in parallel to conveyance belt 21. Counter electrode 27 is grounded. Consequently, a potential difference (for example, 20 kV to 200 kV) corresponding to the voltage applied by voltage applying device 26 can be caused between discharger 23 and counter electrode 27. The configuration of the charger is not particularly limited. For example, counter electrode 27 may be negatively charged. Conveyance belt 21 may be formed of a conductor instead of providing counter electrode 27.

Discharger 23 is formed of a conductor and has a long shape, and its interior is a cavity. The cavity accommodates raw material liquid 22 therein. Raw material liquid 22 is supplied from raw material liquid tank 29 to the cavity of discharger 23 by a pressure produced by pump 28 communicating with the cavity of discharger 23. Raw material liquid 22 is discharged from the discharge outlet toward the principal surface 3B by the pressure produced by the pump 28. Discharged raw material liquid 22 causes electrostatic explosion to produce a fibrous material (second fibers 2F) during movement in a charged state in a space between discharger 23 and conveyance belt 21. In the above-described manner, a precursor in which second nonwoven fabric 2 and third nonwoven fabric 3 are laminated is obtained. In this case, second fibers 2F right after being generated are charged, but this is temporary, and second fibers 2F eventually lose a charging property.

Fiber diameter D2 of the generated second fibers 2F is preferably equal to or less than 1 μm. Fiber diameter D2 may be changed by adjusting ejection pressure of raw material liquid 22, an applied voltage, the concentration of raw material liquid 22, a distance between the discharge outlet and third nonwoven fabric 3, the internal temperature and humidity of the nonwoven fabric former, and the like. An ejection condition may be set so that fiber diameter D2 is smaller than fiber diameter D1 of first nonwoven fabric 1 which will be laminated in the subsequent steps.

Adhesive Spraying Step

Successively, adhesive 35 is sprayed onto principal surface 2B of second nonwoven fabric 2 sent to an upper side of conveyance rolls 31. Adhesive 35 is preferably sprayed in a solid state in that the adhesive is easily unevenly distributed to second nonwoven fabric 2. The solid state is a state in which a predetermined shape is held, and is, for example, a powder or paste state. Adhesive 35 is sprayed onto principal surface 2B of second nonwoven fabric 2 according to, for example, a spray method or a free fall method.

Above all, the adhesive is preferably powdery in that the adhesive can be easily uniformly sprayed. Average particle diameter D50 of the powdery adhesive is not particularly limited, and is, for example, 100 μm to 300 μm. Average particle diameter D50 is a median diameter in a volume particle size distribution obtained by a laser diffraction type particle size distribution measurer.

Adhesive applier 203 includes, for example, spraying device 34 provided with adhesive tank 32 provided on the upper side in adhesive applier 203 and accommodating adhesive 35, and with spray 33 for spraying adhesive 35. For example, the powdery adhesive is sprayed from spray 33 and is then mainly attached to principal surface 2B.

Heating Step

After adhesive 35 is sprayed onto principal surface 2B and before first nonwoven fabric 1 is laminated, in heater 204, adhesive 35 is heated and melted over conveyance rolls 41 by heating device 42. Heating device 42 is not particularly limited, and a well-known device may be selected as appropriate. A heating temperature may be set depending on a melting point of adhesive 35 as appropriate, and is, for example, 100° C. to 200° C.

In a case where two nonwoven fabrics are bonded to each other, a method is generally used in which a hot melt adhesive or the like is disposed between the two nonwoven fabrics, and the adhesive is pressed while being melted by a heater roll or the like. In this method, the adhesive easily penetrates into any void of each nonwoven fabric, and thus it is difficult to make the adhesive unevenly distributed to one of the nonwoven fabrics. In a case where a nonwoven fabric to be charged is used, if a lot of adhesive penetrates into voids of the nonwoven fabric, the electric field strength formed by the nonwoven fabric tends to be reduced. On the other hand, in a case where adhesive 35 is melted before first nonwoven fabric 1 to be charged is laminated, an amount of the adhesive penetrating into first nonwoven fabric 1 can be reduced even if first nonwoven fabric 1 is thereafter laminated. Thus, first nonwoven fabric 1 and second nonwoven fabric 2 can be bonded to each other without reducing the electric field strength formed by first nonwoven fabric 1. According to this method, even if adhesive 35 and first fibers 1F are made of the same kind of material, adhesive 35 can be unevenly distributed not to first nonwoven fabric 1 but to second nonwoven fabric 2.

Laminating Step

After adhesive 35 is melted, first nonwoven fabric 1 is laminated on principal surface 2B of second nonwoven fabric 2 sent to an upper side of conveyance roll 51. In first nonwoven fabric laminator 205, first nonwoven fabric 1 is supplied from the upper side of precursor 10a and is thus laminated on precursor 10a via adhesive 35. If first nonwoven fabric 1 is long, first nonwoven fabric 1 may be wound on reel 52 in the same manner as third nonwoven fabric 3. In this case, first nonwoven fabric 1 is laminated on second nonwoven fabric 2 while being unwound from reel 52. Thereafter, third nonwoven fabric 3 may be peeled off from second nonwoven fabric 2, and thus the laminated nonwoven fabric composed of first nonwoven fabric 1 and the second nonwoven fabric 2 may be formed.

At this time, preferably, first nonwoven fabric 1 is not heated to a melting point or higher of first fibers 1F from the viewpoint of maintaining the charging property of first nonwoven fabric 1. For example, as disclosed in Japanese Patent Unexamined Publication No. 2001-98453, a nonwoven fabric can be charged according to a method in which a high DC voltage is applied to the nonwoven fabric under a temperature atmosphere which is equal to or higher than a melting point of fibers forming the nonwoven fabric, and the nonwoven fabric is cooled. In other words, if a charged nonwoven fabric is heated to a temperature which is equal to or higher than a melting point thereof, the charging property may be reduced.

In a case where two nonwoven fabrics are laminated via an adhesive and are then bonded to each other by a heater roll or the like by heating adhesive 35 to a melting point thereof or higher, first nonwoven fabric 1 which comes into contact with the heater roll may be heated to the melting point of adhesive 35 or higher. Therefore, in order to suppress a reduction in the charging property of the nonwoven fabric due to heating in the manufacturing process, it is necessary to appropriately adjust the melting point of the fibers forming the nonwoven fabric to be charged, the melting point of adhesive 35, the temperature of the heater roll, and the like, and thus manufacturing conditions become complicated.

On the other hand, according to the present embodiment, in order to laminate first nonwoven fabric 1 after melting adhesive 35, first nonwoven fabric 1 is not necessarily heated. Even in a case of using the heater roll or the like, the temperature of the heater roll may be controlled by taking into consideration only the melting point of first fibers 1F, and thus it becomes easier to determine manufacturing conditions.

After first nonwoven fabric 1 is laminated, laminated nonwoven fabric 10 may be pressed by applying pressure thereto with a pair of pressing rolls 53 (pressing rolls 53a and 53b) disposed on upper and lower sides with laminated nonwoven fabric 10 interposed therebetween, and thus first nonwoven fabric 1 and second nonwoven fabric 2 may be tightly adhered to each other. In this case, if porosity P3 of third nonwoven fabric 3 is higher than porosity P1 of first nonwoven fabric 1, adhesive 35 is easily unevenly distributed to second nonwoven fabric 2 (and third nonwoven fabric 3). The pressure applied by pressing rolls 53 is not particularly limited, but is, for example, 1 kPa to 50 kPa. Laminated nonwoven fabric 10 may be heated along with pressing, but, as described above, a heating temperature is preferably lower than the melting point of first fibers 1F.

Finally, laminated nonwoven fabric 10 may be conveyed from first nonwoven fabric laminator 205, and may be collected by collector 206 disposed on the more downstream side via a roll 61. Collector 206 has therein collecting reel 62 for winding, for example, conveyed laminated nonwoven fabric 10 thereon. Collecting reel 62 is rotationally driven by motor 63.

EXAMPLES

Hereinafter, Examples of the present disclosure will be described in detail, but the present disclosure is not limited to such Examples. Laminated nonwoven fabric 10 was manufactured by using manufacturing apparatus 200 as illustrated in FIG. 3.

A base material composed mainly of cellulose (T3: 300 μm, D3: 15 μm, mass per unit volume: 42 g/m$^2$, and P3: 80% by volume) was used as third nonwoven fabric 3. Second nonwoven fabric 2 (T2: 2 μm) containing second fibers 2F (D2: 273 nm) was laminated on third nonwoven fabric 3 by using an electrostatic spinning method, and thus precursor 10a was obtained. A DMAc solution containing 20% by mass of PES was used as a raw material liquid of second fibers 2F. Second fibers 2F were accumulated in an amount of 0.69 g/m$^2$ on third nonwoven fabric 3.

Successively, powdery adhesive 35 (polyester-based hot melt resin) was sprayed onto second nonwoven fabric 2 of precursor 10a according to a spraying method. An amount of sprayed adhesive 35 was 2.2 g/m$^2$. In adhesive 35, 90% by volume or more of the whole particles had a particle diameter of 180 μm to 250 μm. Next, precursor 10a was heated so as to melt adhesive 35. The heating temperature was 158° C.

First nonwoven fabric 1 was laminated on second nonwoven fabric 2 so that melted adhesive 35 is interposed therebetween. A melt blown nonwoven fabric (potential: 70 kV to 80 kV, T1: 165 μm, D1: 5 μm, P1: 61% by volume, and mass per unit area: 18 g/m$^2$) composed mainly of polypropylene fibers to be charged was used as first nonwoven fabric 1. Next, laminated nonwoven fabric 10 was obtained through pressing using pressing rolls 53. The pressure in the pressing was 5 kPa. Distance d1 and distance d2 were calculated on the basis of a picture of a section of laminated nonwoven fabric 10. Distance d1 was 30 μm, and distance d2 was 50 µm. Obtained laminated nonwoven fabric 10 was attached with dust so as to be brought into a state of having been used for ten years, and was installed in air purifier 100 as illustrated in FIG. 2. It was not found that dust collection efficiency was extremely reduced.

As mentioned above, laminated nonwoven fabric 10 includes first nonwoven fabric 1 and second nonwoven fabric 2. First nonwoven fabric 1 contains charged first fibers 1F. Second nonwoven fabric 2 contains second fibers 2F and is laminated on first nonwoven fabric 1. The fiber diameter of first fibers 1F is larger than the fiber diameter of second fibers 2F. Consequently, even in a case where laminated nonwoven fabric 10 is used as a filter medium for a long period of time, second nonwoven fabric 2 captures dust, and thus high dust collection efficiency is maintained. The fiber diameter of second fibers 2F is small, and thus an increase in pressure loss is suppressed. As a result, the lifetime of laminated nonwoven fabric 10 is prolonged.

Laminated nonwoven fabric 10 may further include an adhesive, and third nonwoven fabric 3 which is laminated on principal surface 2A of second nonwoven fabric 2 not facing first nonwoven fabric 1 and contains third fibers 3F. In this case, the adhesive is present in region R1 located by distance d1 from principal surface 1A of first nonwoven fabric 1 and region R2 located by distance d2 from principal surface 2B of second nonwoven fabric 2. Distance d2 is preferably longer than distance d1. Consequently, the electric field strength formed by first nonwoven fabric 1 is hardly influenced by the adhesive. In other words, the electric field strength tends to be maintained in a management process.

Porosity P3 of third nonwoven fabric 3 is preferably higher than porosity P1 of first nonwoven fabric 1. Consequently, the adhesive hardly penetrates into first nonwoven fabric 1. Porosity P1 is preferably 60% by volume to 95% by volume. Consequently, a pressure loss is reduced.

A ratio d1/T1 of distance d1 to thickness T1 of the first nonwoven fabric is preferably equal to or higher than 0.1 and lower than 0.5. Consequently, the influence of the adhesive on the electric field strength is further reduced.

From the viewpoint of pressure loss, thickness T1 is preferably 100 µm to 500 µm, thickness T2 of the second nonwoven fabric is preferably 0.5 µm to 10 µm, and thickness T3 of the third nonwoven fabric is preferably 150 µm to 500 µm.

D2 is preferably more than 0 µm and less than 1 µm. Consequently, a surface area of the second nonwoven fabric increases, and dust collection efficiency further improves.

The air purifier according to the present disclosure includes the sucker and the discharger of a gas, and the laminated nonwoven fabric disposed between the sucker and discharger. In the laminated nonwoven fabric, the opposite surface to the surface of the first nonwoven fabric facing the second nonwoven fabric faces the sucker. In such an air purifier, dust collection efficiency is high and a pressure loss is low for a long period of time.

In the manufacturing method of the laminated nonwoven fabric of the present disclosure, the first nonwoven fabric containing the charged first fibers is prepared. On the other hand, the raw material liquid containing the raw material resin as a raw material of the second fibers and the solvent dissolving the raw material resin is prepared. The third nonwoven fabric containing the third fibers is prepared. The raw material liquid is sprayed onto the third nonwoven fabric so that the second fibers are generated from the raw material liquid, and the second nonwoven fabric is formed by accumulating the second fibers on the third nonwoven fabric. The solid adhesive is sprayed onto the opposite surface to the surface of the second nonwoven fabric facing the third nonwoven fabric. The adhesive sprayed on the opposite surface is melted. The first nonwoven fabric is laminated on the second nonwoven fabric having the melted adhesive. The laminated nonwoven fabric obtained in this method has high dust collection efficiency and a low pressure loss for a long period of time.

As mentioned above, the laminated nonwoven fabric of the present disclosure can achieve high dust collection efficiency and can suppress an increase in pressure loss even in a case of being used for a long period of time Therefore, the laminated nonwoven fabric is suitable as a filter medium of an air purifier for household use, office use, or the like. Usage of the laminated nonwoven fabric of the present disclosure is not limited to a filter medium of an air purifier, and there may be other usage such as a separation sheet for a battery, and a wiping sheet for wiping dust.

What is claimed is:

1. A laminated nonwoven fabric comprising:
   a first nonwoven fabric containing charged first fibers;
   a second nonwoven fabric laminated on the first nonwoven fabric and containing second fibers;
   an adhesive; and
   a third nonwoven fabric laminated on the second nonwoven fabric and containing third fibers,
   wherein a fiber diameter of the first fibers is greater than a fiber diameter of the second fibers,
   wherein the first nonwoven fabric has a first surface and a second surface facing the second nonwoven fabric on an opposite side to the first surface,
   wherein the second nonwoven fabric has a first surface facing the first nonwoven fabric and a second surface opposite to the first surface of the second nonwoven fabric,
   the third nonwoven fabric is laminated on the second surface of the second nonwoven fabric, and
   the adhesive is present in a first region spanning a first distance d1 from the second surface of the first nonwoven fabric and the adhesive is present in a second region spanning a second distance d2 from the first surface of the second nonwoven fabric, and the second distance d2 is longer than the first distance d1.

2. The laminated nonwoven fabric according to claim 1, wherein porosity of the third nonwoven fabric is greater than porosity of the first nonwoven fabric.

3. The laminated nonwoven fabric according to claim 2, wherein the porosity of the first nonwoven fabric is in a range from 60% to 95% by volume, inclusive.

4. The laminated nonwoven fabric according to claim 1, wherein a ratio d1/T1 of the distance d1 with respect to a thickness T1 of the first nonwoven fabric is in a range from 0.1 to 0.5, inclusive.

5. The laminated nonwoven fabric according to claim 1, wherein a thickness of the first nonwoven fabric is in a range from 100 µm to 500 µm, inclusive,
   wherein a thickness of the second nonwoven fabric is in a range from 0.5 µm to 10 µm, inclusive, and
   wherein a thickness of the third nonwoven fabric is in a range from 150 µm to 500 µm, inclusive.

6. The laminated nonwoven fabric according to claim 1, wherein the fiber diameter of the second nonwoven fabric is more than 0 µm and less than 1 µm.

7. An air purifier comprising:
   a sucker of a gas;
   a discharger of the gas; and
   the laminated nonwoven fabric according to claim 1 disposed between the sucker and the discharger, wherein the first nonwoven fabric has a first surface and a second surface facing the second nonwoven fabric on an opposite side to the first surface, and the first surface faces the sucker.

8. A manufacturing method of a laminated nonwoven fabric, comprising:
preparing a first nonwoven fabric containing charged first fibers;
preparing a raw material liquid containing a raw material resin as a raw material of second fibers and a solvent dissolving the raw material resin;
preparing a third nonwoven fabric containing third fibers;
spraying the raw material liquid onto the third nonwoven fabric so that the second fibers are generated from the raw material liquid, and forming a second nonwoven fabric by accumulating the second fibers on the third nonwoven fabric;
spraying a solid adhesive onto a first surface of the second nonwoven fabric, the first surface being opposite to a second surface facing the third nonwoven fabric;
melting the solid adhesive sprayed onto the first surface; and
laminating the first nonwoven fabric on the first surface of the second nonwoven fabric having the melted adhesive.

9. A manufacturing method of the laminated nonwoven fabric according to claim 8, wherein the adhesive is present in a first region spanning a first distance d1 from the second surface of the first nonwoven fabric and the adhesive is present in a second region spanning a second distance d2 from the first surface of the second nonwoven fabric, after the laminating, and the second distance d2 is longer than the first distance d1.

10. The laminated nonwoven fabric according to claim 1, wherein the second fibers of the second nonwoven fabric are not charged.

* * * * *